(12) United States Patent
Yang et al.

(10) Patent No.: US 12,055,391 B2
(45) Date of Patent: Aug. 6, 2024

(54) MULTI-FREQUENCY HYBRID HETERODYNE LASER TRACKER SYSTEM BASED ON SINGLE LIGHT SOURCE

(71) Applicant: Harbin Institute of Technology, Harbin (CN)

(72) Inventors: Hongxing Yang, Harbin (CN); Ziqi Yin, Harbin (CN); Pengcheng Hu, Harbin (CN); Jiubin Tan, Harbin (CN)

(73) Assignee: Harbin Institute of Technology, Heilongjiang (CN)

( * ) Notice: Subject to any disclaimer, the term of this patent is extended or adjusted under 35 U.S.C. 154(b) by 353 days.

(21) Appl. No.: 17/706,343

(22) Filed: Mar. 28, 2022

(65) Prior Publication Data

US 2023/0061358 A1    Mar. 2, 2023

(30) Foreign Application Priority Data

Aug. 31, 2021 (CN) .......................... 202111009520.5

(51) Int. Cl.
*G01B 9/02001* (2022.01)
*G02B 5/30* (2006.01)
(Continued)

(52) U.S. Cl.
CPC ...... *G01B 9/02007* (2013.01); *G01B 9/02011* (2013.01); *G02B 5/3083* (2013.01); *G02B 27/283* (2013.01); *G02F 1/11* (2013.01)

(58) Field of Classification Search
CPC ... G02F 1/11; G01B 9/02007; G01B 9/02011; G02B 5/3083; G02B 27/283; Y02A 90/10
See application file for complete search history.

(56) References Cited

U.S. PATENT DOCUMENTS

| 7,800,750 B2 * | 9/2010 | Bustamante | G02B 21/32 |
| | | | 356/399 |
| 9,983,052 B1 * | 5/2018 | Brown | G01S 17/89 |

(Continued)

OTHER PUBLICATIONS

Ma et al "The Damping Reinforcing Type Differential Signal Receiver", Apr. 5, 2017, CN 104601247 B (Year: 2017).*

(Continued)

*Primary Examiner* — Sang H Nguyen
(74) *Attorney, Agent, or Firm* — PATENT LAW WORKS LLP

(57) ABSTRACT

The present disclosure provides a multi-frequency hybrid heterodyne laser tracker system based on a single light source. According to the laser tracking system proposed in the present disclosure, multi-frequency laser is obtained by conducting multi-acousto-optic frequency shift on a dual-longitudinal-mode laser unit, and an absolute ranging precision gauge is constructed by using a dual-longitudinal-mode interval of a light source. With the frequency shift difference of a multi-acousto-optic frequency shifter, an absolute ranging roughness gauge is constructed, and the relative displacement measurement of dual-frequency light interference is achieved. Meanwhile, by utilizing the reflection of multiple reflectors and light splitting and combining of polarization prisms, synchronous measurement of multi-wavelength absolute distance, relative displacement and PSD position is achieved, resolving the problem that an existing laser tracker uses multiple light sources, which leads to difference in measurement datum, and consequently to the difficultly in traceback.

8 Claims, 2 Drawing Sheets

(51) Int. Cl.
*G02B 27/28* (2006.01)
*G02F 1/11* (2006.01)

(56) References Cited

U.S. PATENT DOCUMENTS

| | | | | |
|---|---|---|---|---|
| 11,159,235 | B1* | 10/2021 | Nykolak | H04B 10/1143 |
| 2011/0313112 | A1* | 12/2011 | Lorenz | C04B 24/2694 |
| | | | | 526/80 |
| 2013/0185023 | A1* | 7/2013 | Vakoc | G01B 9/02028 |
| | | | | 702/189 |
| 2020/0402534 | A1* | 12/2020 | Singer | G11B 7/0037 |

OTHER PUBLICATIONS

Yang et al "Mixing the Heterodyne for Trace Measuring Tape He—Ne Laser Distance Measuring Device and Method", Sep. 10, 2014, CN 104035086 A. (Year: 2014).*

* cited by examiner

MULTI-FREQUENCY HYBRID HETERODYNE LASER TRACKER SYSTEM BASED ON SINGLE LIGHT SOURCE

CROSS REFERENCE TO RELATED APPLICATION

This patent application claims the benefit and priority of Chinese Patent Application No. 202111009520.5, filed on Aug. 31, 2021, the disclosure of which is incorporated by reference herein in its entirety as part of the present application.

TECHNICAL FIELD

The present disclosure belongs to the technical field of laser ranging, and particularly relates to a multi-frequency hybrid heterodyne laser tracker system based on a single light source.

BACKGROUND ART

In 1985, Lau K, Hocken R et al. proposed the concept of laser trackers for the first time. Laser trackers, as a calibration gauge of robots or numerical control machine tools, provide real-time position feedback of the end-effector for a robot system, thereby achieving high-precision dynamic target measurement. Laser tracking technology has been widely used in robot arm calibration, aerospace, ocean engineering, manufacturing of large-sized parts and equipment and other fields, making it possible to achieve various functions, such as dynamic assembly and calibration, form and position detection, and large scale measurement.

At present, there are many foreign companies producing laser tracker products, such as Leica Camera AG, American API and FARO; the laser trackers from said three companies mainly employ dual light sources to achieve absolute distance measurement, relative displacement measurement, respectively. For example, for the tracker system as referred to in the patent [Laser tracker, method for providing additional measurement functions and computer readable storage medium, publication number: CN105699983B], a He—Ne laser unit and a semiconductor laser unit are taken as the light sources, which leads to difference in the measured reference wavelengths, and consequently to the difficulty in traceback.

Study of laser tracking system started relatively late in China. The single-station-type tracker designed by Tianjin University and Harbin Institute of Technology, despite its high precision, operates merely based on the relative displacement measurement of a double-frequency interferometer, and there is lack of an absolute rangefinder. Therefore, calibration of the "bird's nest" is needed, and it is required that no light breaking occurs in the process of tracking measurement. In the case where light breaking occurs when light beams are blocked by obstacles or the tracking distance is too far, or the tracking speed is too fast, the target needs to be moved back to the "bird's nest", making it difficult to cope with measurement tasks during which sites need to be changed constantly. In spite of the high measurement precision of the laser tracker developed by the Chinese Academy of Sciences [Lao Dabao et al., Optimization design and analysis of the tracking light path of the femtosecond laser tracker, Chinese Journal of Lasers, 2019, 46 (03):192-199.], the double femtosecond laser unit is chosen as the light source of the absolute distance precision measurement system. However, the femtosecond laser frequency comb technology has the disadvantages of large volume and high complexity of light source, high cost, and difficulty in integration.

SUMMARY

In the existing laser tracker system, usually two light sources are needed to measure the absolute distance, relative displacement and position change of position detectors (PSDs), leading to difference in measured reference wavelengths, and consequently to the difficulty in traceback. With regards to this problem, the present disclosure puts forward a multi-frequency hybrid heterodyne laser tracker system based on a single light source, which realizes the purpose of synchronous traceback of the light source and reduction in the system volume.

The present disclosure is achieved by the following technical solutions. Provided is a multi-frequency hybrid heterodyne laser tracker system based on a single light source, the light source adopting a dual-longitudinal-mode He—Ne laser unit 1, where a half-wave plate 2 is placed behind the laser unit 1, and changes the polarization direction of polarized light which has two mutually-perpendicular polarization states and is output from the laser unit 1; a light beam passes through the half-wave plate 2 and afterwards enters a first polarization beamsplitter 3, through which it is split into a horizontally polarized light beam and a vertically polarized light beam, the horizontally polarized light beam and vertically polarized light beam which is obtained upon reflection by a third reflector 11 are transformed into circularly polarized light after passing through a first quarter-wave plate 4 and a second quarter-wave plate 12 respectively, and then the circularly polarized light passes through a second polarization beamsplitter 5 and a fourth polarization beamsplitter 13 respectively to form four polarized light beams, the four polarized light beams correspondingly passing through a first acousto-optic frequency shifter 6, a second acousto-optic frequency shifter 8, a third acousto-optic frequency shifter 14 and a fourth acousto-optic frequency shifter 17 to form polarized light with four different frequencies.

Polarized light produced by the second acousto-optic frequency shifter 8, upon reflection by a second reflector 9, is combined with polarized light produced by the first acousto-optic frequency shifter 6 in a third polarization beamsplitter 10; polarized light produced by the fourth acousto-optic frequency shifter 17, upon reflection by a fifth reflector 18, is combined with polarized light produced by the third acousto-optic frequency shifter 14 in a fifth polarization beamsplitter 15; light beams output from combined light of the third polarization beamsplitter 10 are split into first transmission light beams and first reflection light beams in a second non-polarization beamsplitter 30; the first reflection light beams are split into first horizontally polarized light and first vertically polarized light after passing through a seventh polarization beamsplitter 31; the first vertically polarized light is incident on a target lens 34 through an eighth reflector 32 and a tracking reflector 33 in sequence, reflection light upon reflection by the target lens 34 is incident on an eleventh reflector 39 through the tracking reflector 33 and the eighth reflector 32 again, reflection light upon reflection by the eleventh mirror 39 enters a third non-polarization beamsplitter 40 and is split into second transmission light beams and second reflection light beams; the second transmission light beams are combined with first horizontally polarized light upon reflection by a ninth reflector 35 in an eighth polarization beamsplitter 36, and interference measurement signals are formed by combined light beams output from the eighth polarization beamsplitter 36 upon interference by a third polaroid 37, and enter a third photoelectric detector 38; the second reflection light beams enter a position detector 41, and a space offset of the target lens 34 is decoupled via a position detection unit circuit based on the spot offset and absolute distance measurement on a to-be-detected photosensitive surface.

The first transmission light beams, upon reflection by a sixth reflector 19, are combined with light beams output from combined light of the fifth polarization beamsplitter 15 in a first non-polarization beamsplitter 20 into third transmission light beams and third reflection light beams with four frequencies, the third transmission light beams entering a first photoelectric detector 27 upon interference by a first polaroid 26 as reference signals; the third reflection light beams are split into second horizontally polarized light and second vertically polarized light after passing through a sixth polarization beamsplitter 21, the second horizontally polarized light is incident on the target lens 34 through a fourth quarter-wave plate 24, a seventh reflector 25, and a tracking reflector 33 in sequence, and reflection light upon reflection by the target lens 34 is transformed into vertically polarized light through the tracking reflector 33, the seventh reflector 25, and the fourth quarter-wave plate 24 again to return to the sixth polarization beamsplitter 21; the second vertically polarized light is incident on a pyramid prism 23 through a third quarter-wave plate 22, reflection light upon reflection by the pyramid prism 23 returns to the sixth polarization beamsplitter 21 in a form of transmission after again passing through the third quarter-wave plate 22, and is combined with another light beam in the sixth polarization beamsplitter 21 into a light beam, which forms an absolute distance measurement signal upon interference by a second polaroid 28 to enter a second photoelectric detector 29; and the first photoelectric detector 27 and the second photoelectric detector 29 are connected to an upper computer via an absolute distance measurement circuit.

Further, the absolute distance measurement circuit includes a mixing signal processing unit, a multi-frequency signal separation unit, a signal shaping unit and a digital phase detection unit; reference signals output from the first photoelectric detector 27 and measurement signals output from the second photoelectric detector 29 are synchronously input to the mixing signal processing unit which carries out down-conversion processing, and then inputs signals to the multi-frequency signal separation unit for filtering processing, after filtering processing, signals are transformed into square wave signals by the signal shaping unit, and the digital phase detection unit completes phase measurement on the square wave signals, and transmits the phase measurement result to the upper computer.

Further, signals entering the first photoelectric detector 27 upon interference by the first polaroid 26 and signals entering the second photoelectric detector 29 upon interference by the second polaroid 28 contain two different types of phase information; one refers to the phase information of a precision gauge with a frequency of $v_1-v_2$, which is composed of $v_1+f_1$ and $v_2+f_3$, the other refers to the phase information of a roughness gauge with a frequency of $f_1-f_2$, which is composed of $v_1+f_1$ and $v_1+f_2$; where $f_1=v_1$, $f_3=v_2$; $v_1$ denotes the frequency of horizontally polarized light beams, and $v_2$ denotes the frequency of vertically polarized light beams; $f_1$ denotes the shift frequency of the first acousto-optic frequency shifter, $f_2$ denotes the shift frequency of the second acousto-optic frequency shifter, and $f_3$ denotes the shift frequency of the third acousto-optic frequency shifter.

Further, the laser unit has a dual-longitudinal-mode interval of $\Delta v$.

Further, the four acousto-optic frequency shifters adopt a homologous DDS acousto-optic frequency shifter; diffraction light beams upon frequency shift by the four acousto-optic frequency shifters are all at level +1 or −1; among the four acousto-optic frequency shifters, the second acousto-optic frequency shifter 8 has the same shift frequency as the third acousto-optic frequency shifter 14, and the first acousto-optic frequency shifter 6, the second acousto-optic frequency shifter 8 and the fourth acousto-optic frequency shifter 17 have different shift frequencies.

Further, for dual-longitudinal-mode laser with mutually-perpendicular polarization states produced by the dual-longitudinal-mode He—Ne laser unit 1, the polarization direction is adjusted to horizontal and vertical directions through the half-wave plate 2.

Further, the digital phase detection unit completes the calculation of two phase differences, and obtains a to-be-measured absolute distance L from the formula $L=(m_s+\varepsilon_s)\lambda/2$ based on the two phase differences, where denotes the wavelength of the precision gauge, $m_s$ denotes the integer part of a precision phase signal, and $\varepsilon_s$ denotes a precision phase difference.

Further, sine wave signals with the frequency of $f_1-f_2$ are extracted from multi-frequency hybrid reference signals by the multi-frequency signal separation unit as reference signals of an absolute distance roughness gauge and relative displacement reference signals; the relative displacement reference signals, together with interference signals of relative displacement measurement output from the third photoelectric detector 38 are processed via a relative phase measurement circuit according to the principle of Michelson interference to obtain relative displacement.

The present disclosure has the following beneficial effects.

1. According to the laser tracking system proposed in the present disclosure, multi-frequency laser is obtained by conducting multi-acousto-optic frequency shift on a dual-longitudinal-mode laser unit, and an absolute ranging precision gauge is constructed by using a dual-longitudinal-mode interval of a light source. With the frequency shift difference of the multi-acousto-optic frequency shifter, an absolute ranging roughness gauge is constructed, and the relative displacement measurement of dual-frequency light interference is achieved. Meanwhile, by utilizing the reflection of multiple reflectors and light splitting and combining of polarization prisms, synchronous measurement of multi-wavelength absolute distance, relative displacement and PSD position is achieved, resolving the problem that an existing laser tracker uses multiple light sources, which leads to difference in measurement datum, and consequently to the difficultly in traceback.

2. Two photoelectric detectors are utilized to realize the signal detection of a multi-wavelength ranging method, and multi-frequency measurement gauges are separated through the subsequent circuit, which simplifies an existing device in which multi-frequency measurement gauges are separated with four photoelectric detectors. In this way, the system volume is lowered while the synchronization of measurement is improved, making the system easy to integrate.

3. A homologous acousto-optic frequency shifter is adopted in the present disclosure, such that synchronization in measurement of the multi-frequency measurement gauges is improved.

Figure 1:
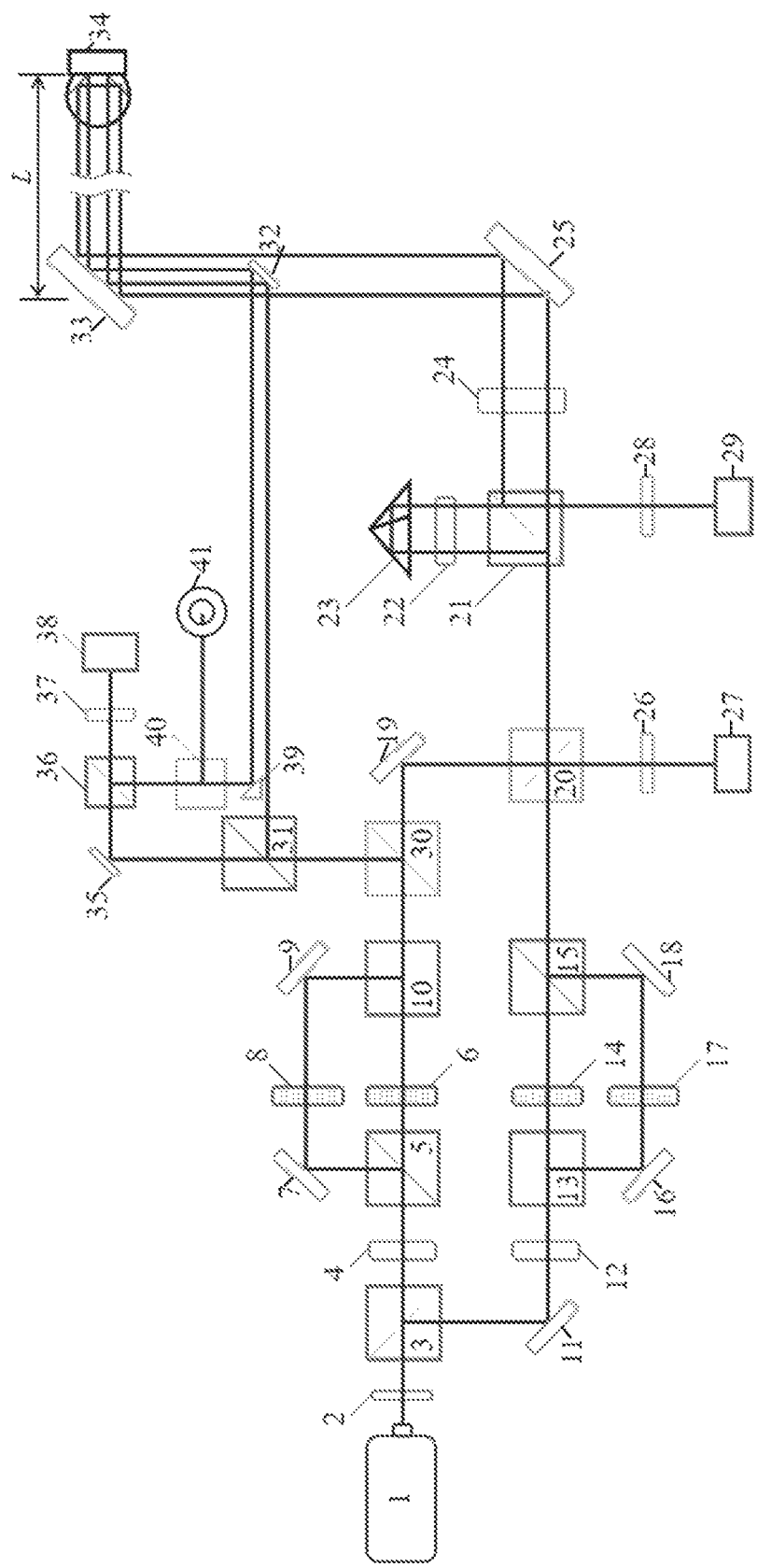
FIG. 1 is a schematic structural diagram of a multi-frequency hybrid heterodyne laser tracker system based on a single light source according to the present disclosure.

Reference Numerals: dual-longitudinal-mode He—Ne laser unit 1, half-wave plate 2, first polarization beamsplitter 3, first quarter-wave plate 4, second polarization beamsplitter 5, first acousto-optic frequency shifter 6, first reflector 7, second acousto-optic frequency shifter 8, second reflector 9, third polarization beamsplitter 10, third reflector 11, second quarter-wave plate 12, fourth polarization beamsplitter 13, third acousto-optic frequency shifter 14, fifth polarization beamsplitter 15, fourth reflector 16, fourth acousto-optic frequency shifter 17, fifth reflector 18, sixth reflector 19, first non-polarization beamsplitter 20, sixth polarization beamsplitter 21, third quarter-wave plate 22, pyramid prism 23, fourth quarter-wave plate 24, seventh reflector 25, first polaroid 26, first photoelectric detector 27, second polaroid 28, second photoelectric detector 29, second non-polarization beamsplitter 30, seventh polarization beamsplitter 31, eighth reflector 32, tracking reflector 33, target lens 34, ninth reflector 35, eighth polarization beamsplitter 36, third polaroid 37, third photoelectric detector 38, eleventh reflector 39, third non-polarization beamsplitter 40 and position detector 41.

DETAILED DESCRIPTION OF THE EMBODIMENTS

The technical solutions of the embodiments of the present disclosure are clearly and completely described below with reference to the accompanying drawings. Apparently, the described embodiments are only illustrative ones, and are not all possible ones of the present disclosure. All other embodiments obtained by a person of ordinary skill in the art on the basis of the embodiments of the present disclosure without creative efforts shall fall within the protection scope of the present disclosure.

Figure 2:
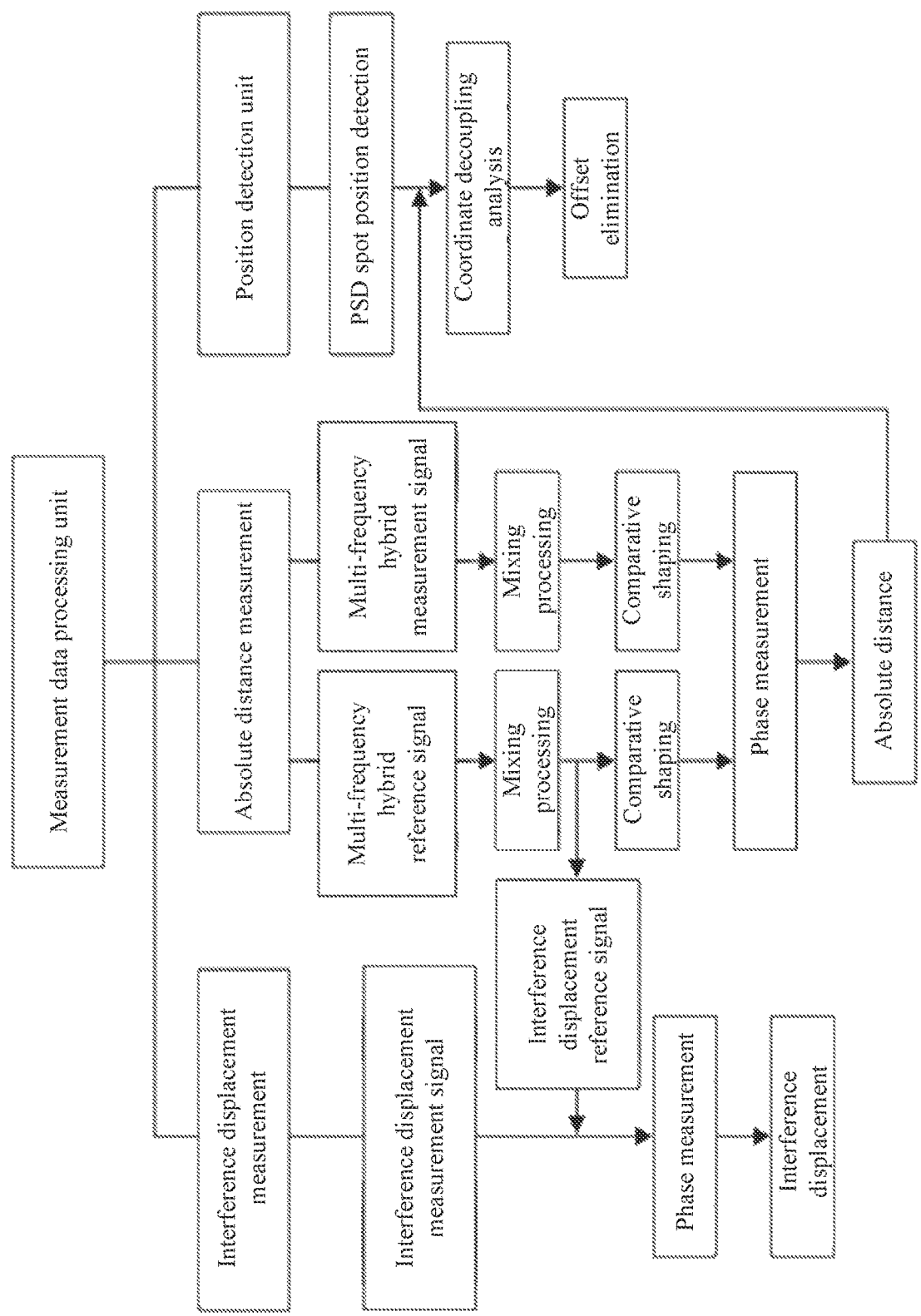
FIG. 2 is a flow diagram illustrating measurement data processing according to the present disclosure.

With reference to FIGS. 1-2, a multi-frequency hybrid heterodyne laser tracker system based on a single light source is provided, the light source adopting a dual-longitudinal-mode He—Ne laser unit 1, where a half-wave plate 2 is placed behind the laser unit 1, and changes the polarization direction of polarized light which has two mutually-perpendicular polarization states and is output from the laser unit 1; a light beam passes through the half-wave plate 2 and afterwards enters a first polarization beamsplitter 3, through which it is split into a horizontally polarized light beam and a vertically polarized light beam, the horizontally polarized light beam and vertically polarized light beam which is obtained upon reflection by a third reflector 11 are transformed into circularly polarized light after passing through a first quarter-wave plate 4 and a second quarter-wave plate 12 respectively, and then the circularly polarized light passes through a second polarization beamsplitter 5 and a fourth polarization beamsplitter 13 respectively to form four polarized light beams, the four polarized light beams correspondingly passing through a first acousto-optic frequency shifter 6, a second acousto-optic frequency shifter 8, a third acousto-optic frequency shifter 14 and a fourth acousto-optic frequency shifter 17 to form polarized light with four different frequencies; where forming polarized light with four different frequencies includes forming the polarized light with frequencies of $v_1+f_1$, $v_1+f_2$, $v_2+f_3$ and $v_2+f_4$, respectively; $v_1$ denotes the frequency of horizontally polarized light beams, and $v_2$ denotes the frequency of vertically polarized light beams; $f_1$ denotes the shift frequency of the first acousto-optic frequency shifter, $f_2$ denotes the shift frequency of the second acousto-optic frequency shifter, $f_3$ denotes the shift frequency of the third acousto-optic frequency shifter, and $f_4$ denotes the shift frequency of the fourth acousto-optic frequency shifter.

Polarized light produced by the second acousto-optic frequency shifter 8, upon reflection by a second reflector 9, is combined with polarized light produced by the first acousto-optic frequency shifter 6 in a third polarization beamsplitter 10; polarized light produced by the fourth acousto-optic frequency shifter 17, upon reflection by a fifth reflector 18, is combined with polarized light produced by the third acousto-optic frequency shifter 14 in a fifth polarization beamsplitter 15; light beams output from combined light of the third polarization beamsplitter 10 are split into first transmission light beams and first reflection light beams in a second non-polarization beamsplitter 30; the first reflection light beams are split into first horizontally polarized light and first vertically polarized light after passing through a seventh polarization beamsplitter 31; the first vertically polarized light is incident on a target lens 34 through an eighth reflector 32 and a tracking reflector 33 in sequence, reflection light upon reflection by the target lens 34 is incident on an eleventh reflector 39 through the tracking reflector 33 and the eighth reflector 32 again, reflection light upon reflection by the eleventh mirror 39 enters a third non-polarization beamsplitter 40 and is split into second transmission light beams and second reflection light beams; the second transmission light beams are combined with first horizontally polarized light upon reflection by a ninth reflector 35 in an eighth polarization beamsplitter 36, and interference measurement signals are formed by combined light beams output from the eighth polarization beamsplitter 36 upon interference by a third polaroid 37, and enter a third photoelectric detector 38; and the second reflection light beams enter a position detector 41, and a space offset of the target lens 34 is decoupled via a position detection unit circuit based on the spot offset and absolute distance measurement on a to-be-detected photosensitive surface.

The first transmission light beams, upon reflection by a sixth reflector 19, are combined with light beams output from combined light of the fifth polarization beamsplitter 15 in a non-polarization beamsplitter 20 into third transmission light beams and third reflection light beams with four frequencies, the third transmission light beams entering a first photoelectric detector 27 upon interference by a first polaroid 26 as reference signals; the third reflection light beams are split into second horizontally polarized light and second vertically polarized light after passing through a sixth polarization beamsplitter 21, the second horizontally polarized light is incident on the target lens 34 through a fourth quarter-wave plate 24, a seventh reflector 25, and a tracking reflector 33 in sequence, and reflection light upon reflection by the target lens 34 is transformed into vertically polarized light through the tracking reflector 33, the seventh reflector 25, and the fourth quarter-wave plate 24 again to return to the sixth polarization beamsplitter 21; the second vertically polarized light is incident on a pyramid prism 23 through a third quarter-wave plate 22, reflection light upon reflection by the pyramid prism 23 returns to the sixth polarization beamsplitter 21 in a form of transmission after again passing through the third quarter-wave plate 22, and is combined with another light beam in the sixth polarization beamsplitter 21 into a light beam, which forms an absolute distance measurement signal upon interference by a second polaroid 28 to enter a second photoelectric detector 29; and the first photoelectric detector 27 and the second photoelectric detector 29 are connected to an upper computer via an absolute distance measurement circuit.

The absolute distance measurement circuit includes a mixing signal processing unit, a multi-frequency signal separation unit, a signal shaping unit and a digital phase detection unit; reference signals output from the first photoelectric detector 27 and measurement signals output from the second photoelectric detector 29 are synchronously input to the mixing signal processing unit which carries out down-conversion processing, and then inputs signals to the multi-frequency signal separation unit for filtering processing, after filtering processing, signals are transformed into square wave signals by the signal shaping unit, and the digital phase detection unit completes phase measurement on the square wave signals, and transmits the phase measurement result to the upper computer.

The digital phase detection unit completes the calculation of two phase differences, and obtains a to-be-measured absolute distance L from the formula $L=(m_s+\varepsilon_s)\lambda_s/2$ based on the two phase differences, where denotes the wavelength of the precision gauge, $m_s$ denotes the integer part of a precision phase signal, and $\varepsilon_s$ denotes a precision phase difference.

Signals entering the first photoelectric detector 27 upon interference by the first polaroid 26 and signals entering the second photoelectric detector 29 upon interference by the second polaroid 28 contain two different types of phase information; one refers to the phase information of a precision gauge with a frequency of $v_1-v_2$, which is composed of $v_1+f_1$ and $v_2+f_3$, the other refers to the phase information of a roughness gauge with a frequency of $f_1-f_2$, which is composed of $v_1+f_1$ and $v_1+f_2$; where $f_1 \ll v_1$, $f_3 \ll v_2$; $v_1$ denotes the frequency of horizontally polarized light beams, and $v_2$ denotes the frequency of vertically polarized light beams; $f_1$ denotes the shift frequency of the first acousto-optic frequency shifter, $f_2$ denotes the shift frequency of the second acousto-optic frequency shifter, and $f_3$ denotes the shift frequency of the third acousto-optic frequency shifter.

Sine wave signals with the frequency of $f_1-f_2$ are extracted from multi-frequency hybrid reference signals by the multi-frequency signal separation unit as reference signals of an absolute distance roughness gauge and relative displacement reference signals; the relative displacement reference signals, together with interference signals of relative displacement measurement output from the third photoelectric detector 38 are processed via a relative phase measurement circuit according to the principle of Michelson interference to obtain relative displacement.

The laser unit has a dual-longitudinal-mode interval of Δv. The laser unit at least includes: a laser tube, laser tube high-voltage power block, a spectroscope, a Wollaston prism, dual-quadrant detectors and a frequency stabilization circuit board structure; the bandwidths of both photoelectric detectors are less than the longitudinal-mode interval Δv of the dual-longitudinal-mode He—Ne laser unit 1. For dual-longitudinal-mode laser with mutually-perpendicular polarization states produced by the dual-longitudinal-mode He—Ne laser unit 1, the polarization direction is adjusted to horizontal and vertical directions through the half-wave plate 2.

The four acousto-optic frequency shifters adopt a homologous DDS acousto-optic frequency shifter; diffraction light beams upon frequency shift by the four acousto-optic frequency shifters are all at level +1 or −1; among the four acousto-optic frequency shifters, the second acousto-optic frequency shifter 8 has the same shift frequency as the third acousto-optic frequency shifter 14, and the first acousto-optic frequency shifter 6, the second acousto-optic frequency shifter 8 and the fourth acousto-optic frequency shifter 17 have different shift frequencies.

The third quarter-wave plate 22 and the pyramid prism 23 should be placed in proximity to the sixth polarization beamsplitter 21 to reduce the measurement error; and the optical components in the optical path are compact in position and structure, thus reducing the influence of spatial stray light on the measurement effect.

The specific measuring principle of the present disclosure is as follows:

As shown in FIG. 1, for dual-longitudinal-mode laser with mutually-perpendicular polarization states produced by the dual-longitudinal-mode He—Ne laser unit 1, the polarization direction thereof is first adjusted to horizontal and vertical directions through the half-wave plate 2; the light beams with adjusted polarization directions are split by the first polarization beamsplitter 3, the frequency of horizontally polarized laser is set to $v_1$, and the frequency of vertically polarized laser is set to $v_2$; the horizontally polarized light with the frequency of $v_1$ is transformed into first circularly polarized light through the first quarter-wave plate 4, and the vertically polarized light with the frequency of $v_2$ is transformed into second circularly polarized light through the second quarter-wave plate 12, and then four polarized light beams are formed through the second polarization beamsplitter 5 and the fourth polarization beamsplitter 13, respectively, correspondingly form polarized light with four different frequencies of $v_1+f_1$, $v_1+f_2$, $v_2+f_3$, $v_2+f_4$ through the first acousto-optic frequency shifter 6, the second acousto-optic frequency shifter 8, the third acousto-optic frequency shifter 14 and the fourth acousto-optic frequency shifter 17, where $f_1$=87 MHz, $f_2$=88 MHz, $f_3$=87 MHz, $f_4$=88.01 MHz.

Polarized light produced by the second acousto-optic frequency shifter 8, upon reflection by a second reflector 9, is combined with polarized light produced by the first acousto-optic frequency shifter 6 in a third polarization beamsplitter 10; polarized light produced by the fourth acousto-optic frequency shifter 17, upon reflection by a fifth reflector 18, is combined with polarized light produced by the third acousto-optic frequency shifter 14 in a fifth polarization beamsplitter 15; light beams output from combined light of the third polarization beamsplitter 10 are split into first transmission light beams and first reflection light beams in a second non-polarization beamsplitter 30.

The first reflection light beams are split into first horizontally polarized light and first vertically polarized light after passing through a seventh polarization beamsplitter 31; the first vertically polarized light $v_1+f_2$ is incident on a target lens 34 through an eighth reflector 32 and a tracking reflector 33 in sequence, reflection light upon reflection by the target lens 34 is incident on an eleventh reflector 39 through the tracking reflector 33 and the eighth reflector 32 again, reflection light upon reflection by the eleventh mirror 39 enters a third non-polarization beamsplitter 40 and is split into second transmission light beams and second reflection light beams; the second transmission light beams are combined with first horizontally polarized light $v_1+f_1$ upon reflection by a ninth reflector 35 in an eighth polarization beamsplitter 36, and interference measurement signals are formed by combined light beams output from the eighth polarization beamsplitter 36 upon interference by a third polaroid 37, and enter a third photoelectric detector 38; in this example, the bandwidth of all photoelectric detectors is set to 200 MHz, such that the detected light intensity signal is:

$$I(t)=I_0+|A_1||A_2|\cos(2\pi r(f_1-f_2+f_d)t)$$

where $A_1$ and $A_2$ denote signal amplitude (mV); $I_0$ denotes direct current signals; t denotes moment; and $f_d$ denotes Doppler frequency shift.

The second reflection light beams enter the position detector 41, and the position detection unit circuit decouples the space offset of the target lens 34 based on the spot offset and the absolute distance measurement on the to-be-detected photosensitive surface.

The first transmission light beams, upon reflection by a sixth reflector 19, are combined with light beams output from combined light of the fifth polarization beamsplitter 15 in a non-polarization beamsplitter 20 into third transmission light beams and third reflection light beams with four frequencies, the third transmission light beams enter a first photoelectric detector 27 upon interference by a first polaroid 26 as reference signals, and the light intensity signal detected is:

$$I(t) = I_0+2|A_1||A_2|\cos\left(2\pi(f_1 - f_2)t+4\pi\frac{f_1-f_2}{c}Z\right) + 2|A_3|$$

$$|A_4|\cos\left(2\pi(f_3 - f_4)t - 4\pi\frac{v_2+f_3}{c}L + 4\pi\frac{v_2+f_4}{c}Z\right)$$

where $A_1$, $A_2$, $A_3$ and $A_4$ are the amplitudes of the four-way signals (mV), z denotes the length (m) of a reference arm; and c denotes a speed of light in vacuum.

The third reflection light beams are split into second horizontally polarized light and second vertically polarized light after passing through a sixth polarization beamsplitter 21, the second horizontally polarized light $v_1+f_1$, $v_2+f_3$ is incident on the target lens 34 after passing through a fourth quarter-wave plate 24, a seventh reflector 25, and a tracking reflector 33 in sequence for a to-be-tested distance L, and reflection light upon reflection by the target lens 34 is transformed into vertically polarized light through the tracking reflector 33, the seventh reflector 25, and the fourth quarter-wave plate 24 again to return to the sixth polarization beamsplitter 21; the second vertically polarized light $v_1+f_2$, $v_2+f_4$ is incident on a pyramid prism 23 through a third quarter-wave plate 22, reflection light upon reflection by the pyramid prism 23 returns to the sixth polarization beamsplitter 21 in a form of transmission after again passing through the third quarter-wave plate 22, and is combined with another light beam in the sixth polarization beamsplitter 21 into a light beam, which forms an absolute distance measurement signal upon interference by a second polaroid 28 to enter a second photoelectric detector 29, and the light intensity signal detected is:

$$I(t) = I_0 + 2|A_1||A_2|\cos\left(2\pi(f_1 - f_2)t - 4\pi\frac{v_1+f_1}{c}L + 4\pi\frac{v_1+f_2}{c}Z\right)$$

$$+ 2|A_3||A_4|\cos\left(2\pi(f_3 - f_4)t - 4\pi\frac{v_2+f_3}{c}L + 4\pi\frac{v_2+f_4}{c}Z\right)$$

where L denotes the to-be-measured absolute distance, and Z denotes the length (m) of a reference arm.

Reference signals output from the first photoelectric detector 27 and measurement signals output from the second photoelectric detector 29 are synchronously input to an absolute distance measurement unit as shown in FIG. 2, multi-frequency hybrid signals, upon down-conversion processing, are input to the multi-frequency signal separation unit for filtering processing, and after filtering processing, the signal shaping unit transforms signals into square wave signals, which are then subject to phase measurement via the digital phase detection unit. The digital phase detection unit first obtains the roughness phase difference $\varepsilon_{s-1}$ and the precision phase difference $\varepsilon_s$, and then solves the integer part of the precision phase signal according to the formula $$m_s = \text{int}\left(\frac{\varepsilon_{s-1}\lambda_{s-1}}{\lambda_s} + 0.5 - \varepsilon_s\right)$$

where $\lambda_{s-1}$ and $\lambda_s$ denote the wavelengths of the roughness gauge and the precision gauge, respectively; in this example, the wavelength of the roughness gauge is $\lambda_{s-1}=300$ m, and the wavelength of the precision gauge is $$\lambda_s = \frac{c}{v_2 - v_1} = 0.278 \text{m}$$

finally, the absolute distance L is solved according to the formula $L=(m_s+\varepsilon_s)\lambda_s/2$.

With one part of the multi-frequency hybrid reference signals after frequency mixing and frequency division processing as the relative displacement reference signals, as well as the interference signals of relative displacement measurement output from the third photoelectric detector 38, the phase difference $\Delta\varphi$ is solved according to the principle of Michelson interference, and the displacement of the target lens 34 is derived from the formula $$L = \frac{\Delta\varphi}{4\pi}\lambda$$

where $\lambda$ denotes the vacuum wavelength of the dual-longitudinal-mode laser unit 1.

The multi-frequency hybrid heterodyne laser tracker system based on a single light source proposed in the present disclosure is described as above. Several examples are used for illustration of the principles and implementation methods of the present disclosure. The description of these examples is used to help illustrate the method and its core principles in an example of the present disclosure. Those skilled in the art can make various modifications and variations to the disclosure without departing from the spirit and scope of the disclosure. The disclosure is intended to cover the modifications and variations provided that they fall in the scope of protection defined by the disclosure.

What is claimed is:

1. A multi-frequency hybrid heterodyne laser tracker system based on a single light source, the light source adopting a dual-longitudinal-mode He—Ne laser unit (1), wherein a half-wave plate (2) is placed behind the laser unit (1), and changes the polarization direction of polarized light which has two mutually-perpendicular polarization states and is output from the laser unit (1); a light beam passes through the half-wave plate (2) and enters a first polarization beamsplitter (3), through which it is split into a horizontally polarized light beam and a vertically polarized light beam, the horizontally polarized light beam and vertically polarized light beam which is obtained upon reflection by a third reflector (11) are transformed into circularly polarized light after passing through a first quarter-wave plate (4) and a second quarter-wave plate (12) respectively, and then the circularly polarized light passes through a second polarization beamsplitter (5) and a fourth polarization beamsplitter (13) respectively to form four polarized light beams, the four polarized light beams correspondingly passing through a first acousto-optic frequency shifter (6), a second acousto-optic frequency shifter (8), a third acousto-optic frequency shifter (14) and a fourth acousto-optic frequency shifter (17) to form polarized light with four different frequencies;

polarized light produced by the second acousto-optic frequency shifter (8), upon reflection by a second reflector (9), is combined with polarized light produced by the first acousto-optic frequency shifter (6) in a third polarization beamsplitter (10); polarized light produced by the fourth acousto-optic frequency shifter (17), upon reflection by a fifth reflector (18), is combined with polarized light produced by the third acousto-optic frequency shifter (14) in a fifth polarization beamsplitter (15); light beams output from combined light of the third polarization beamsplitter (10) are split into first transmission light beams and first reflection light beams in a second non-polarization beamsplitter (30); the first reflection light beams are split into first horizontally polarized light and first vertically polarized light after passing through a seventh polarization beamsplitter (31); the first vertically polarized light is incident on a target lens (34) through an eighth reflector (32) and a tracking reflector (33) in sequence, reflection light upon reflection by the target lens (34) is incident on an eleventh reflector (39) through the tracking reflector (33) and the eighth reflector (32) again, reflection light upon reflection by the eleventh mirror (39) enters a third non-polarization beamsplitter (40) and is split into second transmission light beams and second reflection light beams; the second transmission light beams are combined with first horizontally polarized light upon reflection by a ninth reflector (35) in an eighth polarization beamsplitter (36), and interference measurement signals are formed by combined light beams output from the eighth polarization beamsplitter (36) upon interference by a third polaroid (37), and enter a third photoelectric detector (38); the second reflection light beams enter a position detector (41), and a space offset of the target lens (34) is decoupled via a position detection unit circuit based on the spot offset and absolute distance measurement on a to-be-detected photosensitive surface; and the first transmission light beams, upon reflection by a sixth reflector (19), are combined with light beams output from combined light of the fifth polarization beamsplitter (15) in a first non-polarization beamsplitter (20) into third transmission light beams and third reflection light beams with four frequencies, the third transmission light beams entering a first photoelectric detector (27) upon interference by a first polaroid (26) as reference signals; the third reflection light beams are split into second horizontally polarized light and second vertically polarized light after passing through a sixth polarization beamsplitter (21), the second horizontally polarized light is incident on the target lens (34) through a fourth quarter-wave plate (24), a seventh reflector (25), and the tracking reflector (33) in sequence, and reflection light upon reflection by the target lens (34) is transformed into vertically polarized light through the tracking reflector (33), the seventh reflector (25), and the fourth quarter-wave plate (24) again to return to the sixth polarization beamsplitter (21); the second vertically polarized light is incident on a pyramid prism (23) through a third quarter-wave plate (22), reflection light upon reflection by the pyramid prism (23) returns to the sixth polarization beamsplitter (21) in a form of transmission after again passing through the third quarter-wave plate (22), and is combined with another light beam in the sixth polarization beamsplitter (21) into a light beam, which forms an absolute distance measurement signal upon interference by a second polaroid (28) to enter a second photoelectric detector (29); and the first photoelectric detector (27) and the second photoelectric detector (29) are connected to an upper computer via an absolute distance measurement circuit.

2. The system according to claim 1, wherein the absolute distance measurement circuit comprises a mixing signal processing unit, a multi-frequency signal separation unit, a signal shaping unit and a digital phase detection unit; reference signals output from the first photoelectric detector (27) and measurement signals output from the second photoelectric detector (29) are synchronously input to the mixing signal processing unit which carries out down-conversion processing, and then inputs signals to the multi-frequency signal separation unit for filtering processing, after filtering processing, signals are transformed into square wave signals by the signal shaping unit, and the digital phase detection unit conducts phase measurement on the square wave signals, and transmits the phase measurement result to the upper computer.

3. The system according to claim 2, wherein signals entering the first photoelectric detector (27) upon interference by the first polaroid (26) and signals entering the second photoelectric detector (29) upon interference by the second polaroid (28) contain two different types of phase information; one refers to the phase information of a precision gauge with a frequency of $v_1-v_2$, which is composed of $v_1+f_1$ and $v_2+f_3$, the other refers to the phase information of a roughness gauge with a frequency of $f_1-f_2$, which is composed of $v_1+f_1$ and $v_1+f_2$; wherein $f_1=v_1$, $f_3=v_2$; $v_1$ denotes the frequency of horizontally polarized light beams, and $v_2$ denotes the frequency of vertically polarized light beams; $f_1$ denotes the shift frequency of the first acousto-optic frequency shifter, $f_2$ denotes the shift frequency of the second acousto-optic frequency shifter, and $f_3$ denotes the shift frequency of the third acousto-optic frequency shifter.

4. The system according to claim 3, wherein the digital phase detection unit completes the calculation of two phase differences, and obtains a to-be-measured absolute distance L from the formula $L=(m_s+\varepsilon_s)\lambda_s/2$ based on the two phase differences, wherein denotes the wavelength of the precision gauge, $m_s$ denotes the integer part of a precision phase signal, and $\varepsilon_s$ denotes a precision phase difference.

5. The system according to claim 3, wherein sine wave signals with the frequency of $f_1-f_2$ are extracted from multi-frequency hybrid reference signals by the multi-frequency signal separation unit as reference signals of an absolute distance roughness gauge and relative displacement reference signals; the relative displacement reference signals, together with interference signals of relative displacement measurement output from the third photoelectric detector (38) are processed via a relative phase measurement circuit according to the principle of Michelson interference to obtain relative displacement.

6. The system according to claim 1, wherein the laser unit has a dual-longitudinal-mode interval of $\Delta v$.

7. The system according to claim 1, wherein the four acousto-optic frequency shifters adopt a homologous DDS acousto-optic frequency shifter; diffraction light beams upon frequency shift by the four acousto-optic frequency shifters are all at level +1 or −1; among the four acousto-optic frequency shifters, the second acousto-optic frequency shifter (8) has the same shift frequency as the third acousto-optic frequency shifter (14), and the first acousto-optic frequency shifter (6), the second acousto-optic frequency shifter (8) and the fourth acousto-optic frequency shifter (17) have different shift frequencies.

8. The system according to claim 1, wherein for dual-longitudinal-mode laser with mutually-perpendicular polarization states produced by the dual-longitudinal-mode He—Ne laser unit (1), the polarization direction is adjusted to horizontal and vertical directions through the half-wave plate (2).

\* \* \* \* \*